United States Patent [19]
Schmidt

[11] 3,958,115
[45] May 18, 1976

[54] MULTIPLE FLASHLAMP UNIT WITH INDEXING MEANS

[75] Inventor: Ernst Machiel Schmidt, Eindhoven, Netherlands

[73] Assignee: U.S. Philips Corporation, New York, N.Y.

[22] Filed: Sept. 6, 1974

[21] Appl. No.: 503,804

[30] Foreign Application Priority Data
Sept. 28, 1973 Netherlands.................... 7313363

[52] U.S. Cl.................. 240/1.3; 354/142; 431/92
[51] Int. Cl.²........................................ G03B 15/02
[58] Field of Search................. 240/1.3; 354/142; 431/93, 92

[56] References Cited
UNITED STATES PATENTS

| | | | |
|---|---|---|---|
| 3,735,111 | 5/1973 | Shaffer | 240/1.3 |
| 3,753,390 | 8/1973 | Hough et al. | 240/1.3 X |
| 3,795,477 | 3/1974 | Broadt | 240/1.3 X |
| 3,812,339 | 5/1974 | Broadt | 240/1.3 |

*Primary Examiner*—R. L. Moses
*Attorney, Agent, or Firm*—Frank R. Trifari

[57] ABSTRACT

A flashlamp unit which comprises at least one row of percussion flashlamps disposed on an elongate base plate with striker springs which are locked in the prestressed condition. The unit also includes at least one elongate body extending and movable in the longitudinal direction of the base plate. The body has a plurality of projections, each cooperating with one striker spring for unlocking.

12 Claims, 16 Drawing Figures

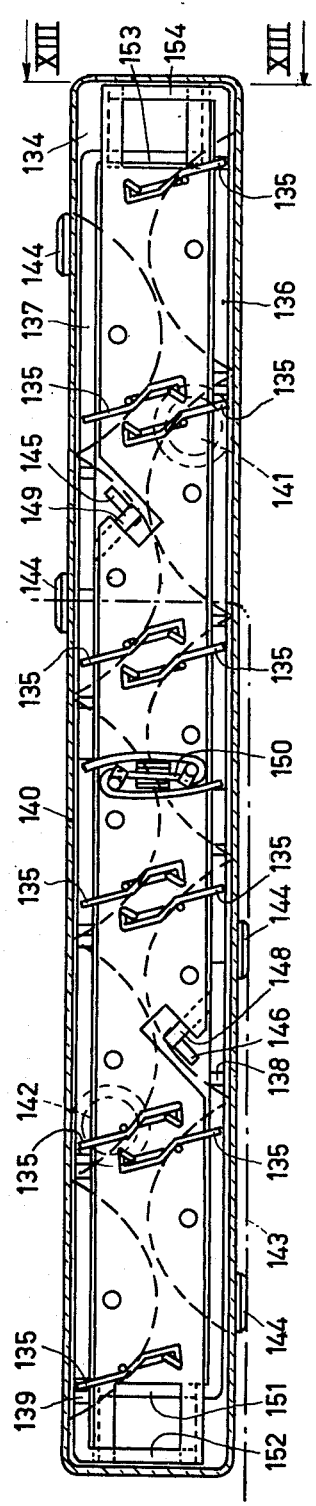
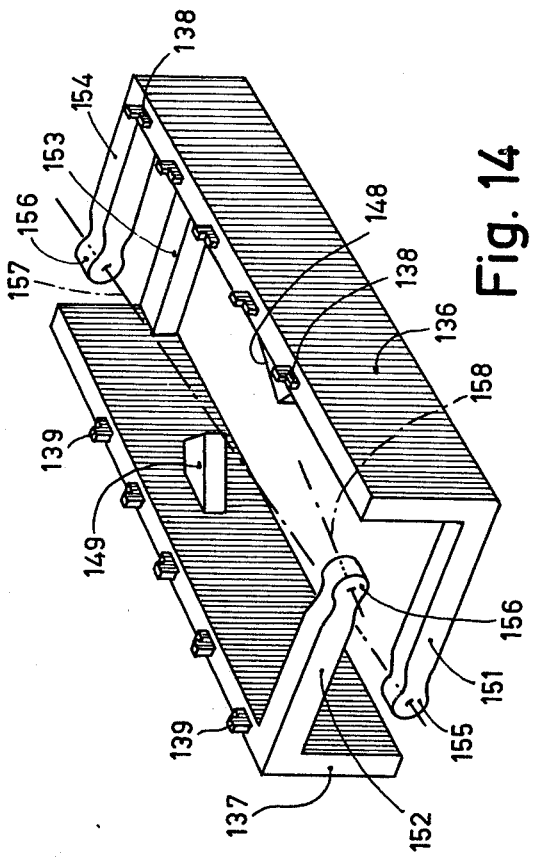
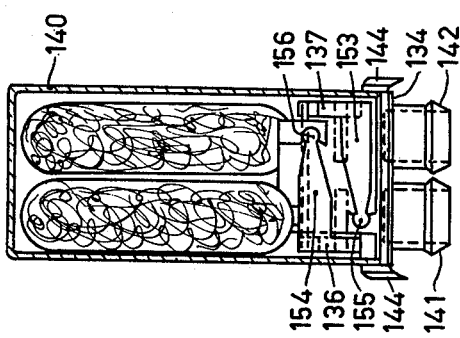

MULTIPLE FLASHLAMP UNIT WITH INDEXING MEANS

The invention relates to a flashlamp unit comprising a number of combustion flashlamps arranged in at least one row, mounted on an elongate base plate and extending in parallel with their longitudinal axes, which lamps can each be fired by a stroke against a lamp part, said flashlamp unit comprising a number of striker springs which are locked in an energized condition, which number corresponds to the number of flashlamps and which springs are designed to give a stroke against the lamp part of one of the flashlamps after unlocking, said unit furthermore comprising one elongate body which extends in the longitudinal direction of the base plate, is movable in said direction and has a number of projections which are each designed to unlock one striker spring, said body, for unlocking each time one of the striker springs, being movable by cooperation with a member to be introduced into the unit from without. Such a flashlamp unit is known from the U.S. Pat. No. 3,735,111.

In the known flashlamp unit the unlocking of each striker spring is carried out by pushing said spring which in the energized condition bears against a pin projecting from the base plate over said pin with a beveled edge of the projection of the body. The striker springs can be unlocked sequentially by causing the body to move stepwise in the longitudinal direction of the base plate. In the known flashlamp unit said stepwise movement of the body is realized by the action of a pin which may form part of a camera. Said pin is caused to engage teeth forming part of the body and is then moved in the longitudinal direction of the base plate so that the body moves.

It is the object of the invention to provide a flashlamp unit of the above-mentioned type in which a number of measures are taken by which said unit can be actuated by a camera which has a pin-shaped member which can make a substantially stabbing movement which is coupled to the action of the shutter mechanism. The stabbing movement of the pin need not be rectilinear but, when the pin is secured to a rotatable arm in the camera, may be circular. Such cameras are known and may be used in cooperation with the so-called flash cubes which comprise four flashlamps to be fired by a stroke.

The flashlamp unit of the type to which the present invention relates is characterized in that the direction of the unlocking movement of the body occurs mainly trasversely to the plane of the base plate, a transport spring being present in the unit and exerting on the body a force acting in the longitudinal direction of the base plate so that the body after each unlocking movement moves in the longitudinal direction of the base plate over such a distance that another projection assumes an initial position suitable for unlocking. In a position of the flashlamp unit according to the invention in which it is coupled to the camera, the direction of the unlocking movement of the body is at least substantially equal to the direction of the stabbing movement of the pin-shaped member of the camera. Upon actuating the unit, each time one projection of the body is in an initial position suitable for unlocking a striker spring. As a result of the unlocking movement transverse to the plane of the base plate the locked striker spring is lifted over a cam present on the base plate by said projection, which striker spring then gives a stroke against a part of a flashlamp. After said unlocking movement the body is moved in the longitudinal direction of the base plate by the transport spring over such a distance that a second projection is moved in an initial position which is suitable for unlocking a second striker spring. When the body is then moved again by the pin in a direction transverse to the plane of the base plate, said second striker spring will be unlocked. The transport spring may be formed as a resilient piece of wire which is secured to the base plate with its one end and to the body with its other end, or, for example, as a helically wound spring.

A favourable embodiment of the flashlamp unit according to the invention is characterized in that each of the projections has a step-like shape in which the first tread of the step is designed to unlock the associated striker spring, the riser of the second tread bearing against a part of the striker spring in a position of the projection suitable for unlocking said striker spring. When such a projection is in a position suitable for unlocking a striker spring, the riser of the second tread of said projection bears against said striker spring with a force supplied by the transport spring. The striker spring is present above or engages the first tread. Upon unlocking, the striker spring is pushed in a direction away from the base plate by said first tread, after which the body is moved by the transport spring until the riser of the second tread of a subsequent projection bears against an associated still locked striker spring. The pitch of the projections is preferably equal to or larger than the distance between the longitudinal axes of the flashlamps plus the thickness of the material of each of the striker springs. The distance over which the body after an unlocking movement is each time moved by the transport spring is equal to or larger than the thickness of the material of each of the striker springs.

According to another favourable embodiment of the flashlamp unit according to the invention the body has teeth which cooperate with an escapement which forms part of the unit and which enables a stepwise movement of the body. Unlike in the above-mentioned embodiment the control of the stepwise movement of the body is not ensured by the risers of the second treads of the steplike projections but by the escapement. In this case the projections may have a simple, for example rectangular, shape. The escapement is preferably secured to the baseplae and arranged so as to be actuatable by the action of a pin-shaped member which penetrates into the unit and may from part of a camera.

Still another embodiment of the flashlamp unit according to the invention is characterized in that the body has a recess which is placed so that as a result of the movement of the body said recess is present opposite to the member to be introduced into the unit from without when all the flashlamps of the row have been fired. The object of these means is to warn the photographer when all the flashlamps of a row have been used. When actually said situation occurs, the member emerging from the camera, can further penetrate into the unit due to the presence of said recess in the body than is the case when one or more non-fired flashlamps are still present in the row. The pin-shaped member itself may penetrate into the recess of the body or, when the unit comprises an escapement, cause a part of said escapement to enter into the recess. In known cameras having such a pin-shaped member the larger depth of penetration of the pin-shaped member in the flashlamp unit causes, via a transmission mechanism, a movement of a warning vane which becomes visible in the viewfinder of the camera. As a result of this the photographer's attention is drawn to the fact that when he actuates the shutter mechanism of the camera no flashlamp will be fired.

A further embodiment of the flashlamp unit according to the invention in which the flashlamps are arranged in two parallel rows is characterized in that the body is formed as a beam extending centrally between the rows of flashlamps and having two series of projections, each series being designed to unlock the striker springs which are destined to fire the flashlamps of one row. It is very advantageous in this embodiment that therewith a very narrow flashlamp unit can be obtained which is easy to put away.

Still another embodiment of the flashlamp unit according to the invention is characterized in that the body is shaped as a beam which is arranged on the base plate so as to be pivotable about a shaft extending at least substantially parallel to the longitudinal direction of the beam. In this case the unlocking movement of the body is not rectilinear but circular. The tangent at the circle described by the body during the unlocking, however, extends mainly transversely to the plane of the base plate. In this embodiment of the flashlamp unit according to the invention the beam preferably has one or more transverse beams which extend in the lateral direction and of which the free ends remote from the beam are pivotably connected to the base plate. In this case a narrow flashlamp unit can be obtained also when the unit comprises two parallel extending rows of flashlamps. According to the invention, such a flashlamp unit is characterized in that the unit comprises two beams having transverse beams formed integral therewith, the free ends of the transverse beams of one beam being present between the other beam and the free ends of the transverse beams formed integral therewith. Viewed in the direction transverse to the plane of the base plate, the transverse beams of each beam preferably assume a position shifted relative to each other. The advantages of this embodiment are that as a result of this the length of the flashlamp unit is restricted and that two identical assemblies of beam with side beams can be used. In this case the axis about which the beams pivot does not extend parallel to the plane of the base plate but encloses a small angle with it.

Another favourable embodiment of the flashlamp unit according to the invention is characterized in that the unit has two beams which are connected together by common transverse beams, said transverse beams being secured to the base plate so as to be pivotable about another shaft extending centrally between the longitudinal axes of the beams. The assembly of beams and transverse beams may be formed as a frame work which is arranged so as to be sunk in the base plate.

According to still another embodiment of the flashlamp unit according to the invention the beams and the transverse beams are formed as the edge parts of a board-like configuration.

Still another embodiment of the flashlamp unit according to the invention, which unit comprises two parallel extending rows of flashlamps, is characterized in that the beams are connected to the base plate independently of each other so as to be pivotable about a common shaft extending centrally between the beams. The beams are preferably present on the side of the base plate which is remote from the flashlamps and which has a number of recesses through which the projections on the beams project. A preferred embodiment of said flashlamp unit is characterized in that the transport spring is formed as a helically wound piece of wire extending coaxially with the central shaft about which the beams are pivotable and of which piece of wire two ends parts each exert a force on one of the beams acting oppositely to the direction of the unlocking movement. Due to this design and arrangement of the transport spring the movements of both beams are realised by one single spring.

Still another embodiment of the flashlamp unit according to the invention is characterized in that one or more springs are present which exert a force on the beam acting oppositely to the direction of the unlocking movement. Due to the action of said spring or springs it is prevented that the beam performs an undesired unlocking movement. This might take place, for example, when the unit is shaken.

The invention will be described in greater detail with reference to the drawing, in which.

FIG. 12 is the plan view of the base plate of another embodiment of the flashlamp unit according to the invention.

FIG. 13 is the sectional view taken on the line XIII—XIII of FIG. 12.

FIG. 14 is a perspective view of the movable bodies occuring in the flashlamp unit shown in FIGS. 12 and 13.

Figure 1:
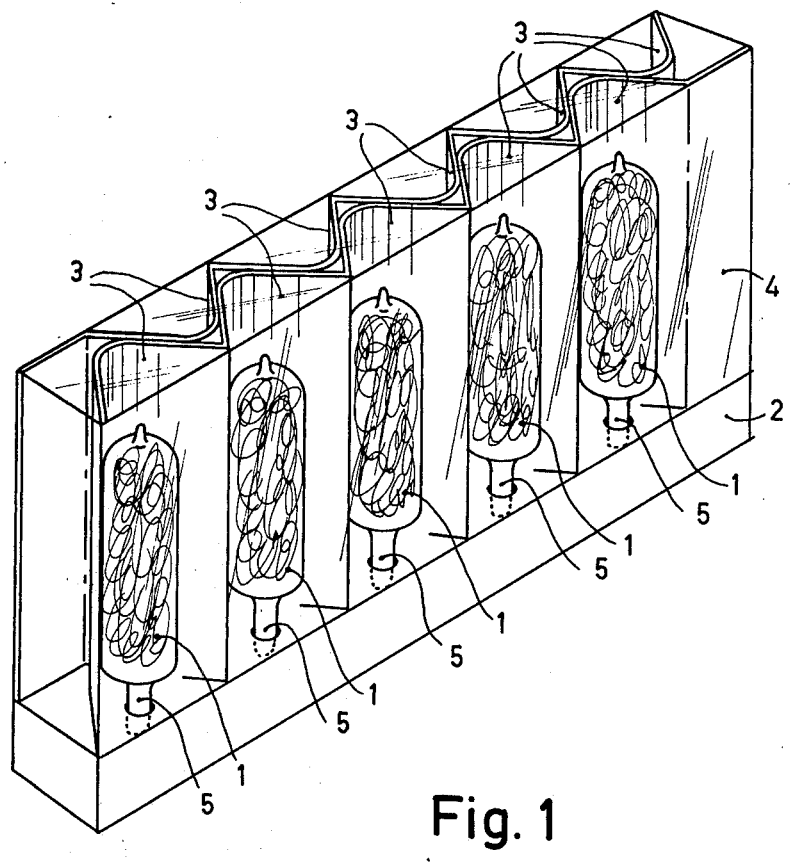
FIG. 1 is a perspective view of an embodiment of a flashlamp unit according to the invention, which unit has two rows of 5 flashlamps each.

The flashlamp shown in FIG. 1 comprises two rows of each having five combustion flashlamps 1 extending in parallel with their longitudinal axes and arranged on an elongate base plate 2. The flashlamps cooperate with reflectors 3 which are positioned so that the reflectors of one row are nested in the reflectors of the other row. The assembly of lamps and reflectors is surrounded by a cover 4 of transparent material which cover is connected to the base plate by means of, for example, a glued joint. Each flashlamp comprises a metal tubular part 5 which is inserted in a recess in the base plate with a part of its longitudinal dimension. Each lamp can be fired by means of a stroke against the lamp part 5. This stroke can be given by a striker spring which for that purpose is unlocked from a pre-energized condition.

Figure 2:
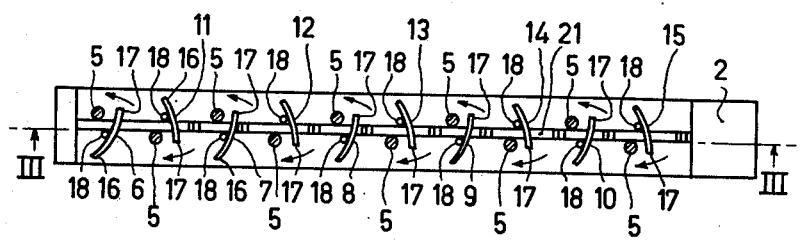
FIG. 2 is the plan view of the base plate with movable body of the flashlamp unit shown in FIG. 1.
Figure 3:
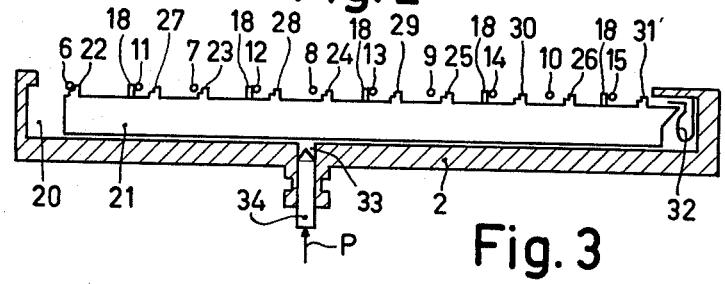
FIG. 3 is a cross-sectional view III—III of FIG. 2
Figure 3A:
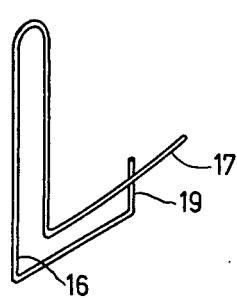
FIG. 3a shows one of the striker springs in detail.

FIGS. 2 and 3 show the locked striker springs in the pre-energized condition. The striker springs 6, 7, 8, 9 and 10 are destined to fire the flashlamps of one row, while the striker springs 11, 12, 13, 14 and 15 are destined to fire the flashlamps of the other row. The striker springs are secured to the base plate with their end parts 16. The striker springs may show a hairpin-like shape as is shown in FIG. 3a. The free end parts 17 of the striker springs remote from the end parts 16 each bear against a cam 18 projecting from the plane of the base plate. Said cam 18 may be formed integral with the material of the base plate 2 which is preferably manufactured from a synthetic material but may also be formed by a bent part 19 of the striker spring as is shown in FIG. 3a.

Figure 3B:
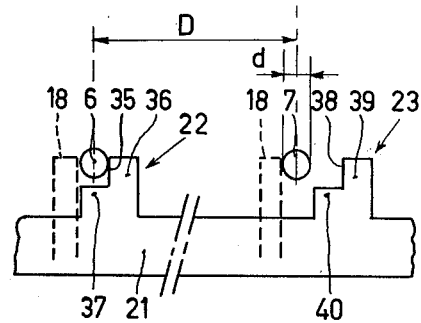
FIG. 3b shows a detail of FIG. 3 on an enlarged scale.

The base plate 2 comprises a slot 20 extending in its longitudinal direction centrally between the rows of lamps, in which slot a body in the form of a beam 21 is arranged so as to be movable. The beam 21 has two series of projections. The projections of the first series are denoted by 22 to 26, the projections of the second series by 27 to 31. As shown in FIG. 3b said projections have a step-like shape. The flashlamp unit according to the invention furthermore comprises a transport spring 32 (see FIG. 3) which exerts a permanent force on the beam 21 acting in the longitudinal direction of the base plate. In this embodiment the transport spring is formed as a leaf spring bent in the form of a U. The base plate 2 furthermore has an aperture 33 via which the beam 21 can cooperate with a pin-like member 34 which preferably forms part of a camera which can be coupled to the unit. The pin-shaped member 34 is designed to make a stabbing movement in the direction of the arrow P and can thus cause the ignition of one flashlamp.

The operation of the flashlamp unit according to this embodiment of the invention is as follows: when the beam 21 is in the position shown in FIGS. 2 and 3, only striker spring 6 touches the beam. Actually, as shown in FIG. 3b on an enlarged scale, striker spring 6 bears against the riser 35 of the second tread 36 of projection 22. The force with said riser 36 engages said striker spring 6 is supplied by the transport spring 32. In this position the striker spring may also touch the first tread 37 of projection 22 but this is not necessary for a ready operation of the unit. All the other striker springs are at some distance from the associated projections. The pawls 18 which hold the striker springs in the pre-energized condition are shown in broken lines in FIG. 3b. When the pin-shaped member 34 coupled to the shutter mechanism of the camera penetrates into the unit via the aperture 33, the beam 21 is lifted in a direction transverse to the plane of the base plate 2. As a result of said unlocking movement of the body the first tread 37 of projection 22 lifts striker spring 6 over pawl 18. The striker spring 6 is then unlocked and will give a stroke against the tubular part of the associated flashlamp which is thus fired. The direction of the striking movement of the striker springs is denoted by arrows in FIG. 2. In the unlocking movement of beam 21 only striker spring 6 in unlocked because, as appears from FIGS. 3 and 3b, the first treads of the other projections are moved past the associated striker springs. For that purpose the pitch of the projections in this embodiment is slightly larger than the centre distance D between the striker springs plus the thickness d of the spring material. The centre distance D of the striker springs corresponds to the distance between the longitudinal axes of the flashlamps. After unlocking the striker spring 6, the beam 21 is moved by the action of spring 32 until riser 38 of the second tread 39 of projection 23 touches striker spring 7. The first tread 40 of projection 23 is moved below striker spring 7. Projection 23 then is in an initial position suitable for unlocking striker spring 7. In this manner the striker springs 6, 7, 8, 9 and 10 can be sequentially unlocked. After unlocking striker spring 10, projection 27 is in an initial position suitable for unlocking striker spring 11. Because, however, striker spring 11 is designed to fire a flashlamp of the other row, the flashlamp unit should first be removed from the camera, rotated through 180°, and then be connected again.

The movable body which, according to the invention, is designed to make a stabbing movement extending mainly transversely to the plane of the base plate may be connected to the base plate in various manners. FIGS. 1, 2 and 3 show a first example hereof.

Figure 4:
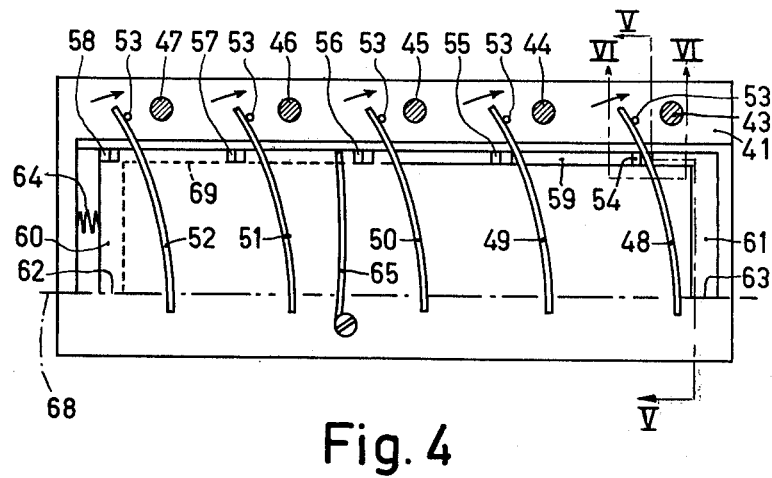
FIG. 4 is the plan view of the base plate with the movable body of another embodiment of the flashlamp unit according to the invention.
Figure 5:
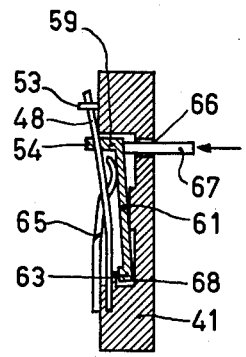
FIG. 5 is the sectional view taken on the line V—V of FIG. 4.
Figure 6:
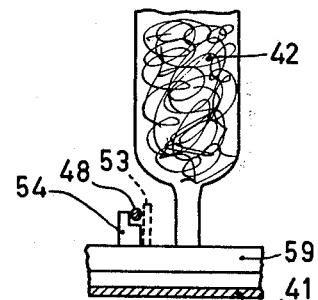
FIG. 6 is the cross-sectional view taken on the line VI—VI of FIG. 4.

Another example is shown in FIGS. 4, 5 and 6. FIG. 4 shows a base plate 41 of a flashlamp unit having one row of five flashlamps 42. Only the metal tubular lamp parts 43 to 47 of said flashlamps are visible in FIG. 4. The flashlamps 42 can be fired by means of the striker springs 48 to 52 which are held in the locked condition by pawls projecting from the plane of the base plate. Unlocking of the striker springs occurs by means of steplike projections 54 to 58 on a beam 59 at the ends of which transverse beams 60 and 61 occur. As shown in FIG. 5, the free ends 62 and 63 remote from the beam 59 are connected to the base plate 41 so as to be pivotable. Said flashlamp unit furthermore comprises a transport spring 64 which exerts a force (directed to the right in FIG. 4) on the assembly of beam and transverse beams, as well as a spring 65 which exerts a force which is operative to the right in FIG. 5 and hence opposite to the direction of the unlocking movement of the beam. The base plate 41 has an aperture 66 via which the beam 59 is accessible for a pin-shaped member 67 which preferably forms part of a camera and penetrates into the unit.

The operation of this flashlamp unit is essentially the same as that shown in FIGS. 1, 2 and 3. One difference is, however, that the beam does not describe a rectilinear unlocking movement directed transversely to the plane of the base plate, but a circular movement in which the tangent at the circle described by the beam extends approximately transversely to the plane of the base plate. The beam pivots about the axis denoted by 68. The presence of spring 65 prevents the beam 59 from performing an unlocking movement other than under the influence of the pin-shaped member 67.

In the emodiment shown in FIGS, 4, 5 and 6 the assembly of beam and transverse beams constitutes a frame. This assembly may, of course, also be formed by the edge parts of a board-like configuration. The plan view of such a configuration would distinguish from the configuration shown in FIG. 4 only by the absence of the boundary line 69 of beam 59 and transverse beams 60 and 61. Said boundary line is shown partly in broken lines in FIG. 4.

Figure 8:
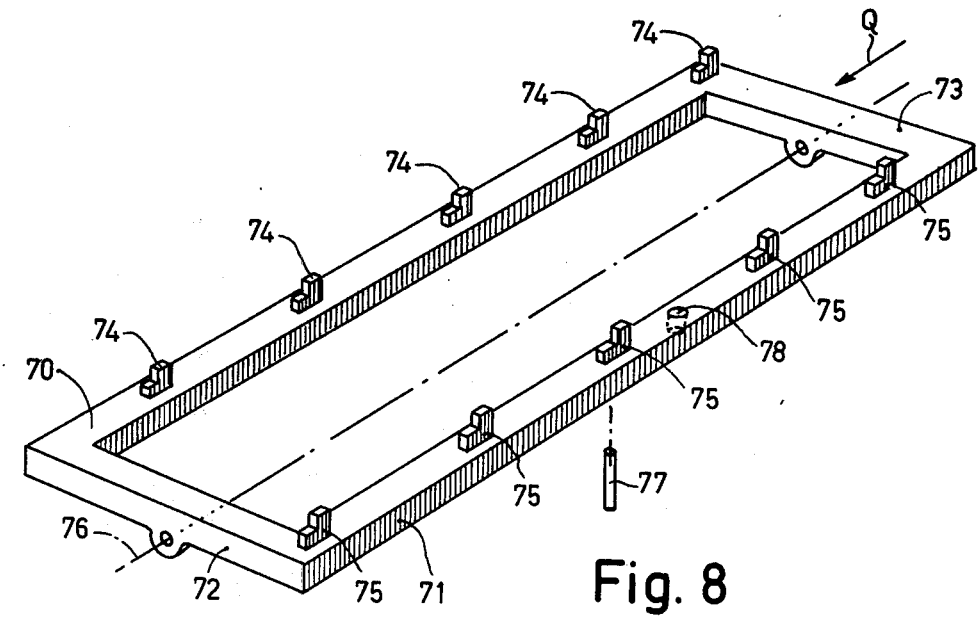
FIG. 8 is a perspective view of another body of a flashlamp unit having two parallel rows of flashlamps.

The construction shown in FIG. 8 is suitable for use in a flashlamp unit which has two parallel rows of flashlamps. This construction is formed by two beams 70 and 71 which are connected by laterally extending common transverse beams 72 and 73. Each of the beams 70 and 71 comprises five step-like projections 74 and 75, respectively. The assembly of beams and transverse beams is connected to the base plate of the unit so as to be pivotable about a central axis 76. A force supplied by a transport spring not shown is furthermore operative on said assembly in the direction of the arrow Q. The operation of this assembly of beams if otherwise equal to that of the embodiment shown in FIGS. 4, 5 and 6. When using a flashlamp unit having beams as shown in FIG. 8, first those flashlamps should be fired which are present on the side of beam 71. The unit can then be rotated 180°C so that the flashlamps present on the side of beam 70 are moved in a position suitable for firing. The movement of the beams with which each time one striker spring is unlocked is caused by the pin-shaped member denoted in FIG. 8 by 77 and preferably forming part of a camera. This member 77 impacts against the lower side of one of the beams 71, 70. In this embodiment beam 71 has a recess 78 which is arranged so that when the five flashlamps associated with beam 71 have been used and thus the assembly of beams has been moved five times by the action of the transport spring, said recess 78 is present just in the elongation of pin-shaped member 77. When this situation is reached, the pin-shaped member 77 can further penetrate into the unit than is the case when one or more of the said five flashlamps are still unused. As a result of this, a warning signal can be given to the photographer, as described above.

Figure 7:
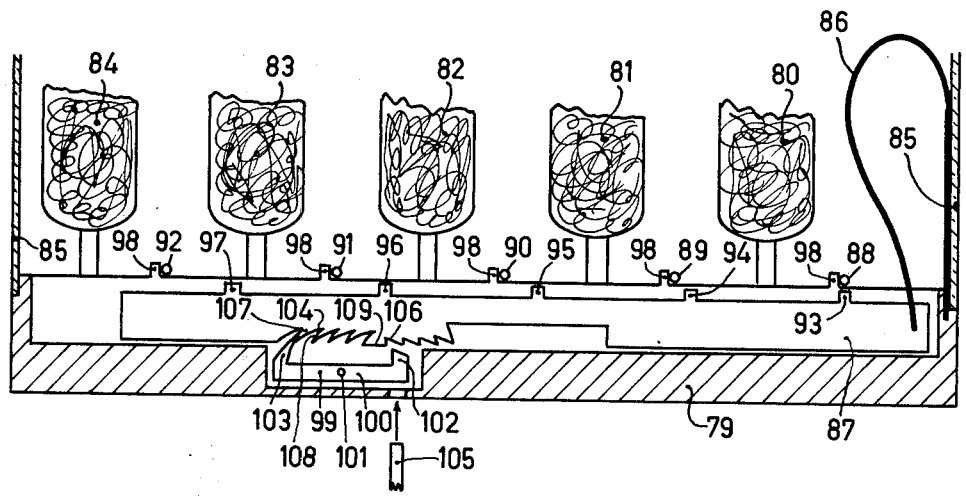
FIG. 7 is the side elevation of the body of still another embodiment of the flashlamp unit according to the invention.

FIG. 7 shows another embodiment of the flashlamp unit according to the invention. This unit comprises a base plate 79, a row of flashlamps 80 to 84 cooperating with reflectors, a transparent cover 85, a transport spring 86, a movable body 87 and striker springs 88 to 92. The body 87 has projections 93 to 97. The striker springs are locked in the pre-energized condition by the bosses 98 which in this embodiment form part of the base plate 79. The unlocking of each striker spring occurs when the body is moved upwards. Each time one of the striker springs is pushed over the associated boss by one of the projections 93 to 97. The subsequent stepwise movement of the body 87 in the longitudinal direction of the base plate is not controlled as in the above described embodiments by a step-like shape of the projections but by an escapement 99. Said escapement comprises a beam 100 which is secured to the base plate 79 so as to be pivotable about a shaft 101 and at the ends of which pallets 102 and 103 occur. Said pallets cooperate with teeth 104 forming part of the body 87. Upon actuating the flashlamp unit by a pin-shaped member 105 penetrating into the unit, pallet 102 of the escapement is pressed against tooth 106 so that the body 87 is moved in a direction upwards in FIG. 7 and striker spring 88 is unlocked. The escapement pivots to the left so that pallet 103 is released from tooth 107. Due to the action of transport spring 86 the body 87 then moves to the left. Due to the inclined position of tooth 106 the escapement is turned to the left so that pallet 103 engages tooth 108. The body has then been moved over such a distance that projection 94 is present below striker spring 89. When all the five flashlamps have been fired, pallet 103 no longer engages a tooth but will bear with its tip against edge 109. The escapement assumes a position relative to the position shown which is turned to the left. The pin-shaped member may then penetrate further into the unit than is the case in the position shown of the escapement so that in the above-described manner a warning signal can be given to the photographer.

Figure 9:
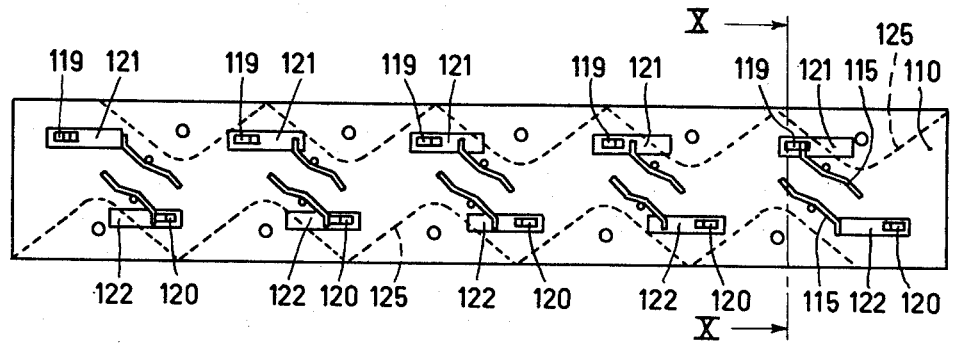
FIG. 9 is the plan view of the base plate of still another embodiment of the flashlamp unit according to the invention.
Figure 10:
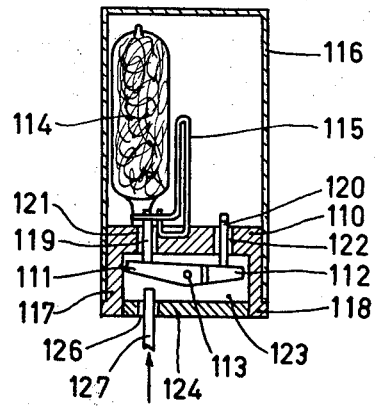
FIG. 10 is the sectional view taken on the line X—X of FIG. 9.
Figure 11:
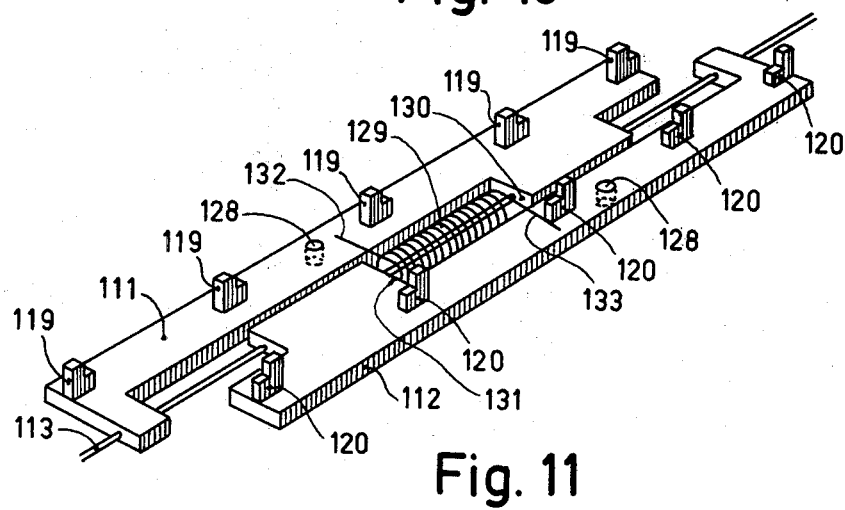
FIG. 11 is a perspective view of the movable bodies destined to co-operate with the base plate shown in FIG. 9.

A particularly attractive embodiment of a flashlamp unit according to the invention having two rows of flashlamps is shown in FIGS. 9, 10 and 11. This unit comprises two bodies 111 and 112 which are movable in the longitudinal direction of the base plate 110 and which are pivotable independently of each other about a common shaft 113. Two rows of each five flashlamps 114 and also two rows of each five striker springs 15 are arranged on the base plate and are enveloped by a transparent cover 116. In this embodiment the said cover is secured to edge parts 117 and 118 extending along the base plate 110 by means of an adhesive. The bodies 111 and 112 have projections 119 and 120, respectively, which are incorporated in recesses 121 and 122, respectively, in the base plate 110. The bodies 111 and 112 as well as the shaft 113 are present in the cavity 123 which is formed by the base plate 110 and the edge parts 117 and 118. This cavity is closed by an elongage cover 124. The reflectors cooperating with the flashlamps 114 are denoted by broken lines 125 in FIG. 9. The cover 124 has two recesses 126 via which a pin-shaped member 127 can penetrate into the unit. As shown in FIG. 11, the bodies 111 and 112 each have a recess 128 which are positioned so as to be present opposite to the recesses 126 in the cover 124 when all the flashlamps of the associated row have been fired. The pin-shaped member 127 can then penetrate into said recess 128 so that in the above-described manner a warning can be given to the photographer.

In this embodiment the transport spring 129 has a helically wound shape. Said spring 129 extends coaxially with the shaft 113 and is compressed against the spring action between the edge 130 of body 111 and edge 131 of body 112. The end parts 132 and 133 of the transport spring 129 exert a force on the bodies 111 and 112, respectively, acting oppositely to the direction of the unlocking movement of the bodies. This pressure force is obtained by twisting the spring 129 prior to assembly. The operation of the flashlamp unit is otherwise essentially equal to the operation of the unit shown in FIGS. 4, 5 and 6.

FIGS. 12, 13 and 14 show still another embodiment of the flashlamp unit according to the invention. As shown in FIG. 12, said unit comprises two rows of each five combustion flashlamps which are mounted on a base plate 134 together with associated reflectors and striker springs 135. The unit furthermore comprises two movable bodies 136, 137 which are sunk in the base plate and on which steplike projections 138 and 139, respectively, occur. The lamps and the reflectors are covered by a cover 140 also shown in FIG. 13.

The unit furthermore comprises two coupling members 141 and 142 by means of which the unit can be coupled to a camera. Such a camera is denoted in FIG. 12 by a dot-and-dash line 143. The coupling member 142 is connected to the camera. In this embodiment the edge of the base plate 134 has projecting supporting members 144 which bear against edge parts of the camera and counteract rotation of the flashlamp unit relative to the camera. The base plate 134 has two apertures 145 and 146 each present beside one of the coupling members 141, 142, via which apertures a pin-shaped member forming part of the camera can penetrate into the unit and lift one of the members 136, 137 to fire one of the flashlamps. For that purpose the bodies 136 and 137 have projections 148 and 149, respectively, which are present opposite to the apertures in the base plate and are thus accessible to the pin-shaped member of the camera. The transport spring 150 shown in FIG. 12 is formed in this embodiment as a Z-shaped bent piece of wire the free end parts of which exert a permanent force on the bodies 136 and 137 acting in the longitudinal direction of the base plate.

These bodies are shown in the perspective view of FIG. 14. As shown in this figure, transverse beams 151, 152, 153 and 154 occur at the ends of the bodies. Viewed in the direction transverse to the plane of the base plate, the transverse beams 151 and 154 of body 136 assume a shifted position relative to the transverse beams 152 and 153 occurring on body 137. The free ends 155 and 156 of the transverse beams fit in slots occurring in the material of the base plate (see also FIG. 13). Said slots have such dimensions that in the firing movement by a pin-shaped member the bodies can pivot about the axes 157 and 158, respectively, and can move stepwise after each firing movement. The axes 157 and 158 enclose an angle of approximately 40° with the plane of the base plate. Due to the design of the bodies 136 and 137 with their transverse beams a flashlamp unit is obtained which has a smaller length than would be the case when the transverse beams would be present in the same plane extending parallel to the plane of the base plate. An additional advantage is that both bodies with their transverse beams are entirely of the same shape.

The above description related to a pin-shaped member which preferably forms part of a camera. Of course, an adaptor which can be coupled to a camera and to which the flashlamp unit according to the invention can be secured may also be used. In that case the adaptor has a pin-shaped member which is to be introduced into the unit and which is coupled mechanically to the shutter mechanism.

What is claimed is:

1. A flashlamp unit comprising a number of combustion flashlamps arranged in at least one row, mounted on an elongate base plate and extending in parallel with their longitudinal axes, which lamps can each be fired by a stroke against a lamp part, said flashlamp unit comprising a number of striker springs which are locked in an energized condition, which number corresponds to the number of flashlamps and which springs are designed to give a stroke against the lamp part of one of the flashlamps after unlocking, said unit furthermore comprising at least one elongate body which extends in the longitudinal direction of the base plate, is movable in said direction said body having a number of projections, each projection cooperating with one striker spring to unlock the cooperating striker spring, said body, being movable responsive to an associated member to be introduced into the unit from without, characterized in that the direction of the unlocking movement of the body extends mainly perpendicular to the plane of the base plate, a transport spring being present in the unit and exerting on the body a force acting in the longitudinal direction of the base plate so that after each unlocking movement the body moves in the longitudinal direction of the base plate over such a distance that another projection assumes an initial position suitable for unlocking, wherein each of the projections has a step-like shape, in which the first tread of the step is designed to unlock the associated striker spring, the riser of the second tread bearing against a part of the striker spring in a position of the projection suitable for unlocking said striker spring.

2. A flashlamp unit as claimed in claim 1, characterized in that the pitch of the projections is equal to a dimension larger than the distance between the longitudinal axes of the flashlamps plus the thickness of the material of each of the striker springs.

3. A flashlamp unit as claimed in claim 1, further including a second parallel row of flashlamps and the body is formed as a beam extending centrally between the rows of flashlamps and having two series of projections, each series being designed to unlock the striker springs which cooperate to fire the flashlamps of one row.

4. A flashlamp unit comprising a number of combustion flashlamps arranged in at least one row, mounted on an elongate base plate and extending in parallel with their longitudinal axes, which lamps can each be fired by a stroke against a lamp part, said flashlamp unit comprising a number of striker springs which are locked in an energized condition, which number corresponds to the number of flashlamps and which springs are designed to give a stroke against the lamp part of one of the flashlamps after unlocking, said unit furthermore comprising at least one elongate body which extends in the longitudinal direction of the base plate, is movable in said direction said body having a number of projections, each projection cooperating with one striker spring to unlock the cooperating striker spring, said body, being movable responsive to an associated member to be introduced into the unit from without, characterized in that the direction of the unlocking movement of the body extends mainly perpendicular to the plane of the base plate, a transport spring being present in the unit and exerting on the body a force acting in the longitudinal direction of the base plate so that after each unlocking movement the body moves in the longitudinal direction of the base plate over such a distance that another projection assumes an initial position suitable for unlocking, wherein the body has a recess which is placed so that as a result of the movement of the body said recess is disposed opposite to the member to be introduced into the unit from without when all the flashlamps of the row have been fired.

5. A flashlamp unit comprising a number of combustion flashlamps arranged in at least one row, mounted on an elongate base plate and extending in parallel with their longitudinal axes, which lamps can each be fired by a stroke against a lamp part, said flashlamp unit comprising a number of striker springs which are locked in an energized condition, which number corresponds to the number of flashlamps and which springs are designed to give a stroke against the lamp part of one of the flashlamps after unlocking, said unit furthermore comprising at least one elongate body which extends in the longitudinal direction of the base plate, is movable in said direction said body having a number of projections, each projection cooperating with one striker spring to unlock the cooperating striker spring, said body, being movable responsive to an associated member to be introduced into the unit from without, characterized in that the direction of the unlocking movement of the body extends mainly perpendicular to the plane of the base plate, a transport spring being present in the unit and exerting on the body a force acting in the longitudinal direction of the base plate so that after each unlocking movement the body moves in the longitudinal direction of the base plate over such a distance that another projection assumes an initial position suitable for unlocking characterized in that the body is formed as a beam which is arranged on the base plate so as to be pivotable about a shaft extending at least substantially parallel to the longitudinal direction of the beam and further characterized in that the beam has one or more transverse beams which extend in the lateral direction and of which the free ends remote from the beam are connected to the base plate so as to be pivotable.

6. A flashlamp unit as claimed in claim 5, further including a second parallel row of flashlamps, characterized in that the unit comprises two beams having transverse beams formed integral therewith, the free ends of the transverse beams of one beam being present between the other beam and the free ends of the transverse beams formed integral therewith.

7. A flashlamp unit as claimed in claim 6, characterized in that, viewed in a direction transverse to the plane of the base plate, the transverse beams of each beam assume a position shifted relative to each other.

8. A flashlamp unit as claimed in claim 5, characterized in that the beams and the transverse beams are formed as the edge parts of a board-like configuration.

9. A flashlamp unit as claimed in claim 5, which unit has two parallel extending rows of flashlamps, characterized in that the beams are connected to the base plate independently of each other and so as to be pivotable about a common shaft extending centrally between the beams.

10. A flashlamp unit as claimed in claim 9, characterized in that the transport spring is formed as a helically wound piece of wire which extends coaxially with the central shaft about which the beams are pivotable and of which piece of wire the two end parts each exert a force on one of the beams acting oppositely to the direction of the unlocking movement.

11. A flashlamp unit as claimed in claim 9, characterized in that one or more springs are present which exert a force on the beam acting oppositely to the direction of the unlocking movement.

12. A flashlamp unit comprising a number of combustion flashlamps arranged in at least one row, mounted on an elongate base plate and extending in parallel with their longitudinal axes, which lamps can each be fired by a stroke against a lamp part, said flashlamp unit comprising a number of striker springs which are locked in an energized condition, which number corresponds to the number of flashlamps and which springs are designed to give a stroke against the lamp part of one of the flashlamps after unlocking, said unit furthermore comprising at least one elongate body which extends in the longitudinal direction of the base plate, is movable in said direction said body having a number of projections, each projection cooperating with one striker spring to unlock the cooperating striker spring, said body, being movable responsive to an associated member to be introduced into the unit from without, characterized in that the direction of the unlocking movement of the body extends mainly perpendicular to the plane of the base plate, a transport spring being present in the unit and exerting on the body a force acting in the longitudinal direction of the base plate so that after each unlocking movement the body moves in the longitudinal direction of the base plate over such a distance that another projection assumes an initial position suitable for unlocking characterized in that the body is formed as a beam which is arranged on the base plate so as to be pivotable about a shaft extending at least substantially parallel to the longitudinal direction of the beam further including a second parallel row of flashlamps, characterized in that the unit comprises two beams which are connected together by common transverse beams, said transverse beams being connected to the base plate so as to be pivotable about another shaft extending centrally between the longitudinal axes of the beams.

* * * * *

UNITED STATES PATENT AND TRADEMARK OFFICE
CERTIFICATE OF CORRECTION

PATENT NO. : 3958115

DATED : May 18, 1976

INVENTOR(S) : ERNST MACHIEL SCHMIDT

It is certified that error appears in the above-identified patent and that said Letters Patent are hereby corrected as shown below:

Column 5, line 45 "36" should be --35-- line 64 "in" should be --is--

Column 6, line 56 "emodiment" should be --embodiment--

Column 9, line 23 "$40°$" should be --$4°$--

Signed and Sealed this

Twenty-first Day of December 1976

[SEAL]

Attest:

RUTH C. MASON
*Attesting Officer*

C. MARSHALL DANN
*Commissioner of Patents and Trademarks*